United States Patent [19]

Bartholic

[11] Patent Number: 5,464,591
[45] Date of Patent: Nov. 7, 1995

[54] PROCESS AND APPARATUS FOR CONTROLLING AND METERING THE PNEUMATIC TRANSFER OF SOLID PARTICULATES

[76] Inventor: David B. Bartholic, 75 Wetumpka La., Watchung, N.J. 07060

[21] Appl. No.: 193,456

[22] Filed: Feb. 8, 1994

[51] Int. Cl.⁶ .................................................. B01J 19/00
[52] U.S. Cl. ........................ 422/142; 422/144; 422/145; 422/147; 415/1; 208/86; 208/161; 208/127
[58] Field of Search .................................... 422/142, 144, 422/145, 146, 147; 415/1; 208/127, 161, 86, 88

[56] References Cited

U.S. PATENT DOCUMENTS

| | | | |
|---|---|---|---|
| 4,448,674 | 5/1984 | Bartholic | 208/113 |
| 4,693,808 | 9/1987 | Dewitz | 208/113 |
| 4,724,065 | 2/1988 | Bartholic et al. | 208/86 |
| 4,851,108 | 7/1989 | Bartholic et al. | 208/127 |
| 4,854,180 | 8/1989 | Mauleon et al. | 73/863.86 |
| 4,944,845 | 7/1990 | Bartholic | 202/84 |
| 4,985,136 | 1/1991 | Bartholic | 208/153 |
| 5,289,155 | 3/1994 | Sabottke | 208/157 |
| 5,332,704 | 7/1994 | Bartholic | 502/41 |

Primary Examiner—Timothy M. McMahon
Assistant Examiner—N. Bhat
Attorney, Agent, or Firm—Finnegan, Henderson, Farabow, Garrett & Dunner

[57] ABSTRACT

The method of controlling the flow of a fluidizable particulate solid, e.g., FCC catalyst, which comprises: (a) passing a fluidized stream of the particulate solid downwardly from a source of the particulate solid, e.g., an FCC regenerator, in a first conduit to a junction with a second conduit where the solid particulate is mixed with a stream of a fluid transport medium from a third conduit; (b) passing a stream of the resulting mixed solid particulate/transport medium upwardly in the second conduit at an angle less than 90° from the first conduit for a distance at least as great as the diameter of the first conduit at the junction into a fourth conduit; (c) transporting the particulate solid/fluid transport medium stream in the fourth conduit to a desired location; and (d) controlling the mass flow of the particulate solid in the fourth conduit by setting the flow rate of the transport medium in the third conduit. By determining the temperatures of the particulate solid in the first conduit, the transport medium in the third conduit and the particulate solid transport medium mixture, the mass flow of the particulate solid in the fourth conduit may be controlled by setting the flow rate of the transport medium in the third conduit. Apparatus for carrying out the method is also included.

21 Claims, 1 Drawing Sheet

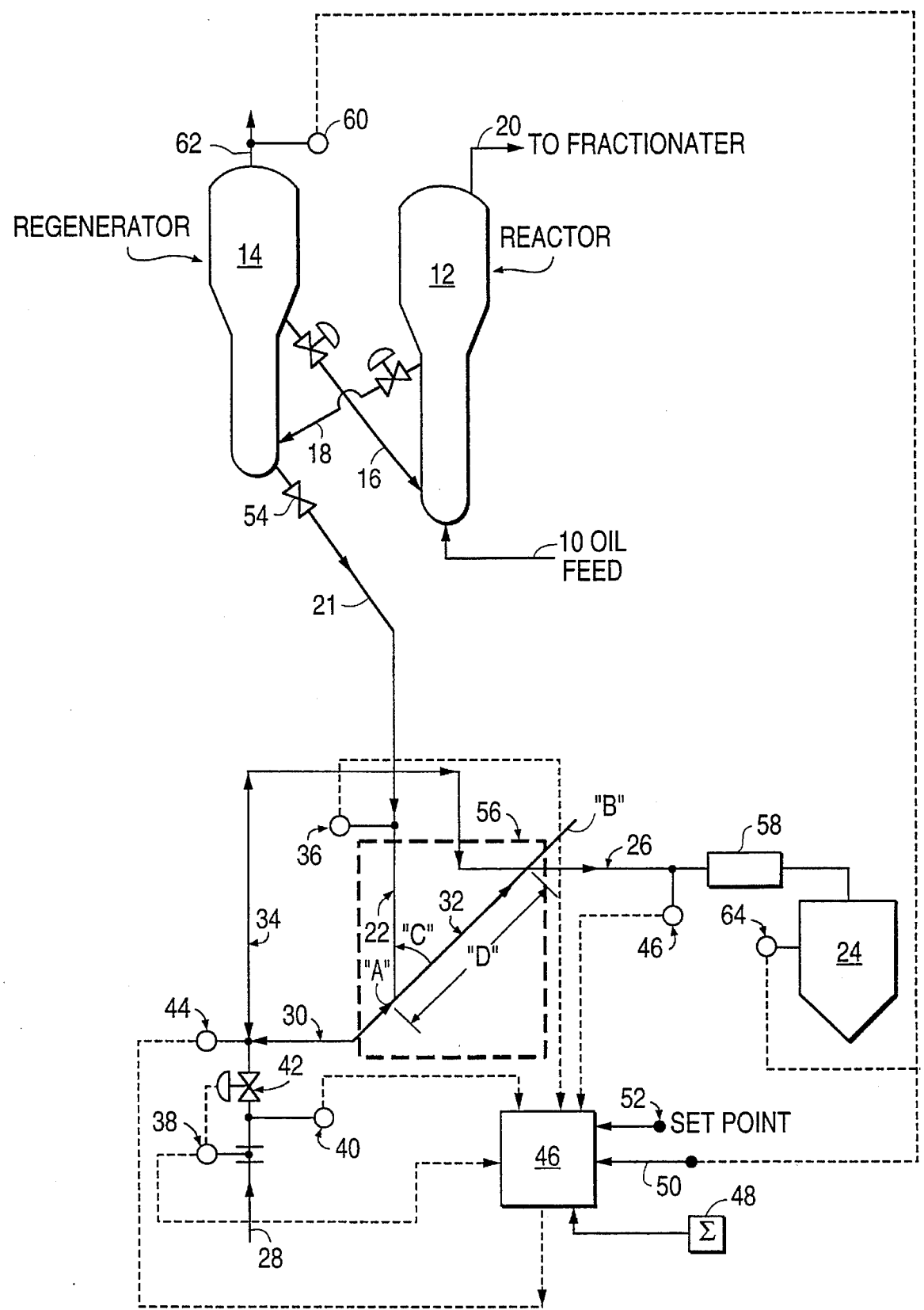

PROCESS AND APPARATUS FOR CONTROLLING AND METERING THE PNEUMATIC TRANSFER OF SOLID PARTICULATES

FIELD OF INVENTION

This invention relates to a method and apparatus for the pneumatic transfer of solid particulates using a fluid transport medium. More particularly, this invention relates to a method and apparatus for the continuous control and/or metering of solid particulates conveyed by a gaseous transport medium, and to fluidized solids process systems wherein a particulate solid, such as a fluid catalytic cracking catalyst, is transported in a measured amount from one location to another.

BACKGROUND

Over the years many types of systems have been developed for controlling the pneumatic movement of solid particulates from one location to another. Examples of material moved in such a manner are grain, plastic pellets, sand, fly ash, cement, powdered coal, carbon black, titanium dioxide, fluid catalytic cracking catalyst, and other particulate solids. Typically, the apparatus employed for controlling the movement of these solid particulates uses a continuous revolving positive displacement type valve or screw feeder, a pinch valve on a timer, or blow pots which discharge the solid particles from a relatively dense system into a pneumatic transport medium so that the particles can be conveyed to another area. In units for the fluid catalytic cracking of hydrocarbons the movement of particulate solids between the reactor and regenerator is controlled by slide valves. However, the use of slide valves where good control is desired is limited to fairly high flow rates, in the range of twenty tons per hour or higher. If accurate continuous metering or measuring of the rate is desired it is common practice to employ some type of weigh system, such as, load cells or actual scales (balances), but normally there is no closed loop control of these functions, as in the system of the present invention. Also, up to now there has not been a reliable system for continuously controlling and metering a specific amount of hot particulates from one location to another pneumatically.

The continuous measurement and control of small amounts of pneumatically transportable fluidizable particulates has typically been a problem. The industry has been plagued with the problem of maintaining a continuous flow of particles in a fluidized transportable state in small lines of less than 6" in diameter without bridging and slugging. This problem has resulted in solutions that are not readily adaptable to continuous measurement or control. An example of this difficulty is readily apparent if one considers the history of the pneumatic transport of ambient fresh and hot regenerated equilibrium catalyst to and from a fluid catalytic cracking (FCC) regenerator.

Since the 1940's oil refiners have been operating fluid catalytic cracking process units (FCCU's) to convert heavy oils to gasoline and olefins for alkylation or petrochemical feedstocks. Up until the energy crisis of 1970's, most refiners were operating their FCC units on high quality virgin gas oils that did not contain any metals or very little metals. This resulted in most refiners adding the fresh FCC catalyst on a batch basis at a rate close to or slightly higher than the catalyst loss rate from the unit. In other words, for most refiners the amount of fresh catalyst added resulted in very little increase in the unit inventory, so the amount of equilibrium catalyst withdrawn from the unit, typically from the regenerator to an equilibrium catalyst storage hopper, was minimal. Typically, the refiner withdrew a small amount of equilibrium catalyst once a week to maintain the inventory and to provide equilibrium catalyst for upsets and start-ups. Since the mid 1970's more and more refiners are processing residual oil in their FCCU's as a method of increasing their transportation yields at the expense of heavy fuel oil. These residual oils contain metals such as vanadium and sodium, which act as FCC catalyst poisons to lower activity, and nickel, which acts as a dehydrogenation catalyst which is harmful to the FCC yield structure. To reduce the effect of these metals on the catalyst activity and selectivity, refiners that process residual oil add more fresh catalyst and therefore need to withdraw more equilibrium catalyst.

As an example, refiner operating on clean gas oil feedstock may add 0.1 to 0.15 pounds of fresh catalyst per barrel of feed to maintain activity and selectivity. With normal cyclone operation in the reactor and regenerator, this particular refiner would be withdrawing from about 0.01 to 0.03 pounds of equilibrium catalyst per barrel of FCCU feed. On the basis of a 50,000 BPD unit, this would amount to 2.5 to 3.75 tons per day of fresh catalyst addition, with 0.25 to 0.75 tons per day of equilibrium catalyst withdrawn. At an average total catalyst inventory in an FCCU of 10 pounds per barrel per day of capacity, 0.25 to 0.75 tons per day amounts to an increase of 0.1% to 0.3% of the total unit catalyst inventory per day.

If this same refiner added residual oil to his FCC feed, the fresh catalyst addition rate might be 1.0 pound per barrel of feed or higher. This then requires a fresh catalyst addition rate of 25 tons per day and a withdrawal rate of about 20 tons per day, or approximately 8% of the inventory per day.

In the early 1970's, it became apparent to some persons in the industry that batch addition of fresh catalyst to the FCCU was resulting in operational swings that were detrimental to unit performance. Also, in the mid 70's with the advent of oxidation promoters and FCC catalytic additives in the early 1980's, the industry started to look for better ways to continuously add these fluidizable particles. Today, the typical FCC unit is designed with some type of "continuous" fresh catalyst addition system, such as, a weigh hopper, a continuous revolving positive displacement valve, a cycled on-off type valve or a pinch valve to control the flow of ambient temperature fresh FCC catalyst from the fresh catalyst storage hopper to the FCC unit regenerator using transport air. The two main drawbacks of these systems is that they are batch systems and they do not really control the rate of addition on a continuous basis so that they cannot be readily automated to control a process variable.

All of the "continuous" systems described above are for ambient temperature and relatively small storage type hoppers that are easily adaptable to load cells but are not usable for handling materials heated to greater than about 400° F. So until now, there has not been any system for continuously controlling the hot equilibrium FCC catalyst withdrawn from the regenerator to control the unit catalyst inventory. Typically this is a batch operation which is normally manually controlled with only a 4 inch gate valve located on the regenerator vessel. On a small amount of catalyst, this withdrawal is usually done once a week since it is not easily controlled, but on residual oil operations it is a daily event.

The withdrawal of large and small amounts of hot equilibrium solid from a fluid regenerator creates a number of problems for the refiner in operating the unit. It creates mechanical and maintenance problems, and creates the potential for injury to operating personnel. In the normal operation of withdrawing the equilibrium catalyst from the regenerator to a catalyst storage hopper, the hopper is operated under vacuum to aid in transporting the hot particulates, and transport air is added to fluidize and transport the particulates from the pressurized regenerator into the lower pressure storage hopper. The control of the withdrawal rate from the regenerator is normally performed by manual control through a 4" gate valve. The gate valve is normally located directly on the side of the regenerator on a regenerator vessel nozzle that is angled down at 45° or greater from the horizontal. Just downstream of the gate valve transportation air is injected to lower the catalyst density and transport it through a 4" line into the storage hopper Those knowledgeable in the operation of these type of systems are familiar with the problem of control with using a 4" gate valve. First of all there is no way to measure the rate, and secondly, the inconsistencies inherent with particulate flow result in large fluctuations in flow rate at the same valve opening, and typically the flow may stop all together. Another problem inherent in this type of operation is the inability to withdraw the exact amount of solid desired. Typically, the operator opens the transport air and regulates the 4" gate valve to establish some particulate flow and then goes about his other duties. If he gets busy, the flow may stop or he may not return to stop the flow until he is made aware of a problem by the board operator, or until he has withdrawn more than the desired amount of particulate. Another problem inherent in this type of system solved by the unique system described here is that because of poor flow control the pipe between the regenerator and storage hopper is subjected to tremendous fluctuations in operating temperature from the transport medium temperature sometimes to within a 100° F. of the regenerator operating temperature, and it may be operated at higher than desired carrying air rates, both of which shorten the life of the system.

In units which withdraw large amounts of particulates over a short period of time, rather than continuously, there is the possibility of mechanical damage to the receiving truck or rail car that removes the equilibrium particulate stream from the site. Withdrawing large amounts of catalyst at one time results in very little cooling of the particulate stream before it reaches the hopper. In fact the temperature of the withdrawn catalyst might be only 100°–300° F. lower than the regenerator temperature, or in the range of 1400°–1100° F., when it reaches the storage vessel. Since the particles are a very good insulator, it is possible to have material in the hopper that is hotter than the 250° F. limit placed on trucks, so that when the particulates are unloaded from the hopper to the truck, the truck is damaged. The present invention provides a system for controlling the rate of particulate flow coupled with the installation of a catalyst cooling system, such as a finned tube section of pipe installed in the catalyst withdrawal line, which will eliminate the problems inherent in the presently used systems.

Up until now there has not been a good method developed for controlling the flow of hot solid particulates, such as hot regenerated fluid catalytic cracking catalyst, regenerated heat transfer medias such as those employed in the processes described in patents directed to the ART Process (described in U.S. Pat. No. 4,263,128) and the 3D Process (described in U.S. Pat. No. 4,859,315), and other hot solid particulates from one system to another at low rates, such as 1 #/day up to 200 tons per day or higher. The system described below now enables the operators of fluidized solid process systems such as the fluid catalytic cracking process, 3D Process, MSCC Process (described in U.S. Pat. No. 4,985,136) and DEMET Process (described in U.S. Pat. No. 4,686,197) and other fluidized particulate type processes to continuously control and measure the rate of moving hot regenerated or spent catalyst solids from the one location to another. The present system is also applicable to controlling and measuring the underflow from third stage cyclones to disposal or final clean-up, and for unloading electrostatic precipitator particulate recovery hoppers. Also, the present system can be used to add fresh catalyst or other solids from storage hoppers into the regenerator. In general, the process and apparatus of the present invention can be used to control a precise amount of any fluidizable solid to be moved from one point to another, provided there is a sufficient pressure differential and transport medium to provide the force needed to move the particulate solid.

In particular, the present invention allows the operator to control and measure the movement of regenerated solid particles from, for example, an FCC or 3D regenerator to a storage hopper or another process system, such as DEMET. The present invention is applicable to the movement, control and measurement of fluidizable particulate solids at any temperature above or below the temperature of the transport media and at any rate up to 20 tons per hour or more. The pressure is not critical, except that the pressure of the source system plus the head of fluidizable solid to be conveyed must be greater than the system pressure to which the fluidizable solid is being conveyed.

Therefore, a primary object of the present invention is an improved method of controlling or metering particulate solids to be pneumatically transported from one location to another. A related object of the present invention is improved apparatus for such controlling or metering of particulate solids. Still a further object of the invention is an improvement in a process system wherein a fluidized particulate solid is moved between locations, which provides a more accurate control and measurement of the amount of particulate solid being transported over a period of time. Other objects and advantages of the present invention will become apparent from the following description thereof and from the practice of the invention.

SUMMARY OF THE INVENTION

The objects of the invention are achieved by apparatus for controlling the flow of a fluidizable particulate solid to be transported, which comprises:

(a) a downwardly extending first conduit having upper and lower ends, the upper end thereof being connectable to a source of the particulate solid;

(b) a second conduit having upper and lower ends, the lower end thereof being connected to the lower end of the first conduit to place the first and second conduits in flow communication, the second conduit having a length extending upwardly from its junction with the first conduit for a distance at least as great as the diameter of the lower end of the first conduit;

(c) a third conduit having first and second ends, the first end being connectable to a source of a fluid transport medium and the second end being connected to the junction to place the third conduit in flow communication with the first and second conduits; and (d) a fourth conduit having a first end and a second end and being in flow communication with the second conduit for receiving a stream of the particulate solid and the transport medium, the second end of said fourth conduit being connectable to a vessel for receiving the transported particulate solid.

According to one embodiment, the invention further includes a fifth conduit having a first end and a second end, the second end thereof being connected to and in flow communication with the first end of said fourth conduit, and the first end thereof being connectable to the source of transport fluid. Advantageously, the upper end of the second conduit is connected to the fourth conduit at a point intermediate the first and second ends thereof.

In a preferred embodiment, the present invention further includes a three-way control valve having a first port connected to the first end of the third conduit and second port connected to the first end of the fifth conduit, and a sixth conduit connecting a third port of the three-way valve to the source of transport medium. The apparatus may also include valve means in the sixth conduit between the three-way valve and the source of transport medium in the sixth conduit to the three-way valve. Most preferably, the apparatus also includes means for measuring the temperature of each of the particulate solid in the first conduit, the transport medium in the sixth conduit and the particulate solid/ transport medium stream in the fourth conduit, means for measuring the mass flow of the transport medium in the sixth conduit; flow control means connected to the sixth conduit for controlling the flow of the transport medium therein; computer/controller means for receiving signals from each of the temperature measuring means and the mass flow measuring means and for outputting a signal to the three-way control valve to control the operation thereof.

Another aspect of the present invention is a method of controlling the flow of a fluidizable particulate solid, which comprises:

(a) passing a fluidized stream of the particulate solid downwardly from a source of the particulate solid in a first conduit to a junction with a second conduit where the solid particulate is mixed with a stream of a fluid transport medium from a third conduit;

(b) passing a stream of the resulting mixed solid particulate/transport medium upwardly in the second conduit at an angle less than 90° from the first conduit for a distance at least as great as the diameter of the first conduit at the junction into a fourth conduit;

(c) transporting the particulate solid/fluid transport medium stream in the fourth conduit to a desired location; and (d) controlling the mass flow of the particulate solid in the fourth conduit by setting the flow rate of the transport medium in the third conduit.

Preferably, the method of the present invention further comprises:

(a) determining the temperature of the particulate solid in the first conduit;

(b) determining the temperature of the transport medium in the third conduit;

(c) determining the temperature of the solid particulate/ transport medium mixture; and (d) setting the flow rate of the transport medium in the third conduit to produce a target mass flow of the particulate solid in the fourth conduit determined in accordance with the following equation:

$$Mp = Mm \cdot Cm \cdot (T46 - T40) / Cp \cdot (T36 - T46)$$

where:

Mp represents the target mass flow of the particulate solid in the fourth conduit, Mm represents the mass flow of the transport medium in the third conduit, Cp represents the heat capacity of the particulate solid, Cm represents the heat capacity of the transport medium, T46 represents the temperature of the particulate solid in the fourth conduit, T40 represents the temperature of the transport medium in the third conduit, T36 represents the temperature of the particulate solid in the first conduit.

BRIEF DESCRIPTION OF THE DRAWINGS

The present invention will be better understood from the following description thereof and by reference to the accompanying drawing, wherein:

FIG. 1 schematically illustrates a fluidized catalytic cracking process unit utilizing apparatus in accordance with the present invention to continuously control the removal of equilibrium catalyst from the regenerator for transport to a catalyst hopper.

DESCRIPTION OF A PREFERRED EMBODIMENT OF THE INVENTION

The present invention will be described with reference to the accompanying drawing depicting its use in a unit for the practice of the well-known fluid catalytic cracking process wherein it is often required that accurately measured quantities of finely divided solid particles, such as fresh catalyst, regenerated catalyst, a catalyst additive or the like, be transported from one location to another. It should be understood, however, that the present invention will also find application in other processes wherein it is desired to pneumatically transfer controlled amounts of particulate solids over a period of time from one location to another. As used herein, the term "pneumatic transfer" refers to the movement of particulate solids to a desired location by the use of air, steam, flue gas, hydrocarbous or another suitable fluid to fluidize the solid particles so as to cause the particles to flow.

Referring to the accompanying drawing, a hydrocarbon feedstock, for example, a gas oil mixed with residual oil, is introduced via line 10 into a lower portion of a riser-type reactor 12 wherein it is contacted with hot FCC catalyst passed from regenerator 14 via line 16. Spent catalyst, after being separated from hydrocarbon vapors, is sent via line 18 to the regenerator where it is regenerated by burning carbonaceous deposits therefrom. Product vapors pass from the reactor via transfer line 20 to a fractionating column and product recovery facilities (not shown). The FCC process is well-known and need not be further described herein.

Equilibrium catalyst may be continuously withdrawn from regenerator 14 via conduit 21 using the present invention to control and/or meter the amount of equilibrium catalyst withdrawn and pneumatically transported to another location, such as catalyst hopper 24, via transport line 26.

The drawing further schematically depicts, in enlarged form, typical components of apparatus for use in carrying out the present process for measuring and controlling the rate of transporting from a source 14, e.g., an FCC regenerator, fluidized particles, e.g., FCC catalyst, from one place to another. In the regenerator, the hot particulates, which are in a dense fluidized phase at a higher pressure than the particulates transported in transport conduit 26, flow downwardly in conduit 21 connected to the upper end of a first conduit 22, which extends downwardly and is preferably vertical to aid in fluidization of the particulates, to its intersection "A" with a third conduit 30, where the dense particulates in conduit 22 are contacted with a fluid transport medium, for example, air supplied through third conduit 30. The catalyst particles then reverse their path and are passed upwardly in a second conduit 32, together with the transport medium from conduit 30, which has a length "D" at least equal to one and preferably 5 or more times the diameter of the lower end of conduit 22. The actual length of D will depend on the pressure differential between intersections A and B, the latter being the intersection of the upper end of conduit 32 with a fourth conduit 26 for transporting the transport medium/solid particle stream. The higher the pressure differential, the longer the length of D, so that the ratio of D to the diameter of conduit 22 might be as high as 10 or more at a 20 psi differential pressure. Conduit 32 extends upwardly from the junction at its lower end with conduit 22 to its upper end which joins transport conduit 26. Conduits 32 and 22 form an angle "C" which is less than 90°, preferably from about 30° to about 60° and most preferably less than 45°. This reverse angle plus the length of D will enable a seal to be formed to stop the flow of particulates if the transport medium in line 30 is shut off. Also, the control method used in the present invention depends on the density change along length D, which results from controlling the amount of aeration medium added through conduit 30 at intersection A, to provide the motivating force and control necessary for proper operation. Directionally, the longer the length of D and the smaller angle C, the better the control.

This present system eliminates the need for control valves of any type in the hot and erosive particulate stream. At intersection B additional transport medium may be added through a fifth conduit 34 to increase the velocity and lower the density of the mixture of gas and particles flowing in fourth conduit 26 so that the resulting dilute phase particulates can be transported to its final destination catalyst hopper 24. It should be noted, that depending on the length of vertical conduit 22, an aeration medium, e.g. air, may be injected therein to insure continuous fluidization and a steady flow rate. If it is necessary to aerate conduit 22, at least the aeration gas flowing between intersection A and the location of temperature indicator 36 should be part of flow measured by flow recording controller 38.

Since the transport medium temperature, measured by temperature indicator 40, and the dense phase temperature, measured by temperature indicator 36, will not vary significantly, a less expensive and simple method to control the process is to set the overall transport medium flow rate with flow recording controller 38 using control valve 42, and controlling the position of three-way control valve 44 to control the temperature of the transport medium/particulate solid stream in conduit 26, measured by temperature indicator 46. Three-way control valve 44 has a first port connected to the first end of third conduit 30, a second port connected to the first end of fifth conduit 34, and a third port connected to a sixth conduit 28 which supplies the transport medium from a source thereof. The dense fluidized particles temperature (T36), plus the transport medium temperature (T40), and the total transport medium flow rate (Mm) are used as inputs to solve the following equation:

$$MP = Mm \cdot Cm \cdot (T46 - T40) / Cp \cdot (T36 - T46)$$

Where:

Mp represents the mass flow of the particulates, #/hr (pounds per hour)

Mm represents the mass flow of transport medium, flow transmitter 38, #/hr

Cp represents the heat capacity of particulates, btu/#-°F.

Cm represents the heat capacity of transport medium, btu/#-°F.

T46 represents the temperature of dilute phase particulates, °F.

T40 represents the temperature of transport medium, °F.

T36 represents the temperature of dense phase particulates, °F.

In a preferred embodiment of this process, these inputs can also be inputs to a computer/controller that will continuously calculate, based on the above equation, the mass flow of particles and control the rate of particulate movement by splitting the flow of the transportation medium with control valve 44. That is, the output of the computer can be used to control three-way valve 44 and the computer output can be used as the input to a summing device 48 to calculate the total tons moved. This computer/controller 46 and summing device 48 are shown in more detail in the drawing. There is also a cascade control input 50 shown in the drawing, which can be used to reset the control point 52 when one might wish to add catalyst, an additive or the like to a system. An Example of such a control system would be an FCC unit using an oxidation promoter, where the amount of promoter added would be adjusted up or down in response to changes in the regenerator flue gas temperature. Other examples of such use in an FCC system are SOX additives wherein the addition rate is controlled by regenerator flue gas SOX content; oxidation promoters wherein the addition rate is controlled by the carbon monoxide (CO) content of the regenerator flue gas; bottoms cracking additives wherein the addition rate is controlled by the bottoms product yield; fresh catalyst addition with the rate, controlled by unit equilibrium activity or conversion level; FCC gasoline octane additives wherein by gasoline fraction octane. In such instances a process parameter is measured and variations in the selected parameter used to reset the control point 52. For example, a sensor 60 in the stack 62 of regenerator 14 may be used to measure the temperature, SOX (sulfur oxides) content or CO content of the regenerator flue gas, with a signal being transmitted therefrom to cascade control input 50 so as to reset the control point 52 in response to the changes in the process parameter selected. Alternatively, the temperature, or other variable of the catalyst in hopper 24 may be measured by a sensor 64 and an appropriate signal transmitted to cascade control input 50.

To illustrate the characteristics needed for proper design of this type of system, an example of the above process description using FCC type catalyst follows. Those skilled in the art will understand that for solids having different flow characteristics, the following design parameters will vary, and the sizing of the conduits 22 and 26 will also depend on the type of solids.

EXAMPLE 1

As an example, if the present process were to use air at 100° F. and 60 psig as the transport medium to continuously control the removal of 5 tons per day (t/d) of equilibrium catalyst from an FCC regenerator operating at 1350° F. and 20 psig into a two inch conduit 26 operating at 5 psig which requires a minimum of 20 feet per second (fps) velocity to have stable flow, then the input to the above equation becomes:

Mm=to control a minimum of 20 fps; set #/hr at 200
Cm=0.255 btu/#-°F.
Cp=0.275
T36=1350° F.
T40=100° F.
Mp=416.7 #/hr; equal to 5 t/d
substituting in the equation;

$$416.7=200(0.255)(T46-100)/0.275(1350-T46)$$

solving:

T46=965° F., and controller T46 would be set for 965° F.

Alternatively, if it was desired to remove only 0.5 tons/day, the controller for T46 would be set for 329° F.

In the case of FCC type particulates, the density in standpipe 22 will typically be between 20–45 pounds per cubic foot, with the preferred range being between 30–40 pounds per cubic foot. If the density is too high bridging will occur and one will need to add aeration air into conduit 22. The downward superficial velocity in standpipe 22 is preferably less than, 6 feet per second (fps). After injection of the transport medium into junction A, shown in the drawing, the desired velocity is from 0.4 fps to 20 fps or higher. After junction B, shown in the drawing, the preferred velocity is greater than 20 fps, but in simple systems without many turns or elevation changes downstream of intersection B, this velocity could be as low as 5 fps.

Using this example, a preferred embodiment of this invention would be as follows. Typically the FCC unit is equipped with a 4" downwardly positioned catalyst withdrawal nozzle that is positioned on the side of the regenerator 14 below the top of the dense bed level and at a maximum angle of 45° from the vertical. At the end of this nozzle a 4" stainless steel gate valve is installed as the main shutoff valve and for controlling the daily withdrawals, catalyst withdrawals at shutdown, or catalyst addition at start-up or daily additions. Typically this 4" gate valve is connected either to the fresh or equilibrium catalyst storage hoppers with 4" pipe complete with carrying air. There is normally a 2" fresh catalyst addition line connected into this 4" line close to a 4" main block valve on the regenerator catalyst withdrawal nozzle. To employ the process herein described, one could connect into this same 4" line and install the process equipment depicted in the drawing, but it is preferred for this example that a new 2" nozzle positioned so that the catalyst will be free draining downwardly at less than 45° from the vertical and below the normal regenerator dense phase level complete with a 2" stainless steel block valve 54 be added into the regenerator. The process equipment depicted in the drawing should be installed as close as possible to the 2" block valve with conduit 22 and connected via conduit 21, positioned substantially vertical and being as short as possible so as to minimize fluidization problems. All of the equipment in contact with the hot regenerated catalyst should be stainless steel and designed for the proper temperature and pressure requirements. As discussed previously, the aeration requirements for the 2" nozzle and conduit 22 need to be considered in the design of the system, and any aeration used should be metered by flow measurement 38.

For the design of 5 T/D of continuous withdrawal, the preferred size of conduit 22 is 0.50 inches ID. For these low rates of catalyst withdrawal, it may not always be possible from design, safety, or equipment considerations to use readily available materials, such as piping. In this case, the preferred embodiment contemplates that the flow control apparatus of the present invention 56, the portion of equipment depicted in FIG. 1 that is inside of the dotted lines, should be fabricated inside a solid block of stainless steel that would be 8"×8"×4". In this case conduit 22 would be reduced from the 2" nozzle size to 0.50" ID within the block. Vertical conduit 22 would continue downward for about 6" into the block to Junction A, where the air transport medium passing through conduit 30 (0.5" ID) would intersect conduit 22 at angle C (40°). The air transport medium injected through conduit 30 at junction A will lower the density of the catalyst to less than that in conduit 22 and transport the catalyst up the angled conduit 32 (0.5" ID) for 6" (length D) to junction B where the remainder of the transport air passed through conduit 34 (0.5" ID) will be added to conduit 26 (1.939" ID) and exit the block. Downstream of the block after temperature point 46 more aeration air can be added to further cool the catalyst, the conduit size can be varied, or a cooling system 58, such as a section of fin tubes, can be added before the catalyst enters the storage hopper 24 to further cool the catalyst.

The start-up and operation of the system of the present; invention requires that the total aeration air passed through flow recorder controller 38 be routed through conduit 34 initially when conduit 26 is opened to the storage hopper. This will insure that the total air rate 38 is on flow control through control valve 42 and three-way valve 44 is closed to conduit 30 and open to junction B through conduit 34, and conduit 26 is opened and not obstructed. After establishing the necessary flow in conduit 26 to maintain at least 20 fps velocity therein, any aeration air to conduit 22 and the withdrawal nozzle are put into service before opening the main block valve 54 on the withdrawal nozzle. Once conduit 22 is inventoried with dense catalyst, the transportation air to junction A is started by slowly opening the three-way valve 44 port to conduit 30. As transport air is added to junction A, the temperature 46 in conduit 26 will start to increase, and temperature 46 may be permitted to increase to the desired value. When the process is stabilized, the system is placed on automatic control, which will control the three-way valve 44 opening and therefore the flow rate of the primary transportation air to junction A, which will determine the withdrawal rate of catalyst from regenerator 14.

EXAMPLE 2

Another example of the use of the system of the present invention would be to add 5 tons per day of fresh FCC catalyst at 80° F. to a regenerator operating at 20 psig through a 2 inch fresh catalyst loading line using plant air at 150° F. In this case the input to the above equation becomes:

Mm=to control a minimum of 20 fps set #/hr at 300
Cm=0.255 btu/#-°F.
Cp=0.275
T36=80
T40=150
Mp=416.7
substituting in the equation:

$$416.7=300(0.255)(T46-150)/0.275(80-T46)$$

solving: T46=108° F., and controller T46 would be set at 108° F.

Besides the novel control features of the system of the present invention, many of the mechanical design features thereof are unique. The angle of conduits 22 and 32 at the intersection A, the flow of transport medium through conduit 30 and the downward flow of dense phase of particulates in conduit 22, coupled with the minimum length D of conduit 32, allows the system to be operated without any mechanical control mechanism located in the hot flowing dense phase particulate stream in conduit 22 or in the outlet conduit 26. This eliminates many mechanical concerns and allows for the particulate flow to be stopped by just stopping the flow of the transport medium to the apparatus of the invention. Also the unique method of maintaining a constant flow of total transport medium provides for a more uniform and constant downstream flow regime that results in less pressure fluctuations and better control of the particulate withdrawal rate. This novel system also allows for great differences in the sizes of conduit 22 and 26 so that by just replacing conduit 22 through intersection B, the amount of solids handled by this process can be varied greatly.

Because this process allows for continuous particulate addition to an FCCU, it can be easily coupled with on stream process control to control the amount of additive or catalyst required to maintain catalyst activity, the degree of regenerator oxidation with oxidation promoters, the degree of SOX removal from regenerator flue gases using SOX additives, the degree of bottoms cracking using bottom cracking additives, and the FCC gasoline octane using octane additives.

Having described a preferred embodiment of the present invention it will be understood that variations and modifications thereof falling within the spirit of the invention may become apparent to those skilled in the art, and the scope of the present invention is to be determined by the appended claims and their equivalents.

What is claimed is:

1. The method of controlling the flow of a fluidized particulate solid used in the processing of a hydrocarbon feedstock, which comprises:

(a) passing a fluidized stream of said particulate solid downwardly from a pressurized source of said particulate solid in a first conduit to a junction with a second conduit where said solid particulate is mixed with a stream of a fluid transport medium from a third conduit;

(b) passing a stream of the resulting mixed solid/particulate transport medium upwardly in the second conduit from the first conduit for a distance at least as great as the diameter of the first conduit at said junction to a fourth conduit;

(c) transporting the particulate solid/fluid transport medium stream in the fourth conduit to a desired location;

(d) determining the temperature of the particulate solid in the first conduit;

(e) determining the temperature of the transport medium in the third conduit;

(f) determining the temperature of the solid particulate/transport medium mixture; and (g) setting the flow rate of the transport medium in the third conduit to produce a target mass flow of the particulate solid in the fourth conduit determined in accordance with the following equation:

$$Mp = Mm \cdot Cm \cdot (T46-T40)/Cp \cdot (T36-T46)$$

where:

$Mp$ represents the target mass flow of the particulate solid in the fourth conduit, $Mm$ represents the mass flow of the transport medium in the third conduit, $Cp$ represents the heat capacity of the particulate solid, $Cm$ represents the heat capacity of the transport medium, $T46$ represents the temperature of the particulate solid in the fourth conduit, $T40$ represents the temperature of the transport medium in the third conduit, $T36$ represents the temperature of the particulate solid in the first conduit.

2. The method of claim 1, further including passing a second stream of a fluid transport medium through a fifth conduit into said fourth conduit to increase the velocity and lower the density of the particulate solid/transport medium therein.

3. The method of controlling the flow of a fluidized particulate solid used in the processing of a hydrocarbon feedstock, which comprises:

(a) passing a fluidized stream of said particulate solid downwardly from a source of said particulate solid in a first conduit to a junction with a second conduit where said solid particulate is mixed with a stream of a fluid transport medium from a third conduit;

(b) passing a stream of the resulting mixed solid particulate/transport medium upwardly in the second conduit at an angle less than 90° from the first conduit for a distance at least as great as the diameter of the first conduit at said junction into a fourth conduit;

(c) transporting the particulate solid/fluid transport medium stream in the fourth conduit to a desired location; and (d) controlling the mass flow of the particulate solid in said fourth conduit by setting the flow rate of said transport medium in said third conduit.

4. The method of claim 3, further including passing a second stream of a fluid transport medium through a fifth conduit into said fourth conduit to increase the velocity and lower the density of the particulate solid/transport medium therein.

5. The method of claim 4, wherein a stream of said fluid transport medium supplied by a sixth conduit is split by a three-way control valve to pass a first portion thereof into said third conduit and a second portion thereof into said fifth conduit.

6. The method of claim 5, wherein said fluid transport medium is passed from said fifth conduit into said fourth conduit at a point upstream of the point at which said solid particulate/transport medium is passed into said fourth conduit.

7. The fluidized process of claim 3, wherein said improvement further comprises:

(a) determining the temperature of the particulate solid in the first conduit;

(b) determining the temperature of the transport medium in the third conduit;

(c) determining the temperature of the solid particulate/transport medium mixture; and (d) setting the flow rate of the transport medium in the third conduit to produce a target mass flow of the particulate solid in the fourth conduit determined in accordance with the following equation:

$$Mp = Mm \cdot Cm \cdot (T46-T40)/Cp \cdot (T36-T46)$$

where:

$Mp$ represents the target mass flow of the particulate solid in the fourth conduit, $Mm$ represents the mass flow of the transport medium in the third conduit, Cp represents the heat capacity of the particulate solid, Cm represents the heat capacity of the transport medium, $T_{46}$ represents the temperature of the particulate solid in the fourth conduit, $T_{40}$ represents the temperature of the transport medium in the third conduit, $T_{36}$ represents the temperature of the particulate solid in the first conduit.

8. The fluidized process of claim 7, further including measuring a selected parameter of said process or characteristic of said particulate solid transported, and re-setting the flow rate of the transport medium in the third conduit in response to variations in the selected parameter.

9. The fluidized process of claim 8, wherein said process is a fluidized catalytic cracking process and said selected parameter or characteristic is at least one of carbon monoxide in the regenerator flue gas, sulfur oxides in the regenerator flue gas, bottoms product yield, equilibrium catalyst activity, gasoline fraction octane or transported particulate solid temperature.

10. Apparatus useful for controlling the flow of a fluidized particulate solid to be transported in a unit for the processing of a hydrocarbon feedstock, which apparatus comprises:

(a) a downwardly extending first conduit having upper and lower ends, the upper end thereof being connectable to a source of said particulate solid;

(b) a second conduit having upper and lower ends, the lower end thereof being connected to the lower end of said first conduit to place said first and second conduits in flow communication, said second conduit having a length extending upwardly from its junction with said first conduit for a distance at least as great as the diameter of the lower end of said first conduit;

(c) a third conduit having first and second ends, said first end being connectable to a source of a fluid transport medium and said second end being connected to said junction to place said third conduit in flow communication with said first and second conduits; and (d) a fourth conduit having a first end and a second end and being in flow communication with said second conduit for receiving a stream of said particulate solid and said transport medium, the second end of said fourth conduit being connectable to a vessel for receiving the transported particulate solid.

11. The apparatus of claim 10, further including a fifth conduit having a first end and a second end, the second end thereof being connected to and in flow communication with the first end of said fourth conduit, and the first end thereof being connectable to said source of transport fluid.

12. The apparatus of claim 11, wherein the upper end of said second conduit is connected to said fourth conduit at a point intermediate the first and second ends thereof.

13. The apparatus of claim 11, further including a three-way control valve having a first port connected to the first end of said third conduit and second port connected to the first end of said fifth conduit, and a sixth conduit connecting a third port of said three-way valve to said source of transport medium.

14. The apparatus of claim 13, further including valve means in said sixth conduit between said three-way valve and said source of transport medium for controlling the flow of said transport medium in said sixth conduit to said three-way valve.

15. The apparatus of claim 14, further including means for measuring the temperature of each of said particulate solid in said first conduit, said transport medium in said sixth conduit and said particulate solid/transport medium stream in said fourth conduit, means for measuring the mass flow of said transport medium in said sixth conduit; flow control means connected to said sixth conduit for controlling the flow of said transport medium therein; computer/controller means for receiving signals from each of said temperature measuring means and said mass flow measuring means and outputting a signal to said three-way control valve to control the operation thereof.

16. The apparatus of claim 10, wherein the length of said second conduit is at least 5 times the diameter of the lower end of said first conduit.

17. The apparatus of claim 10, wherein said angle formed by said first and second conduits is from about 30° to about 60°.

18. The apparatus of claim 17, wherein said angle is less than about 45°.

19. The apparatus of claim 10, wherein during use said source of particulate solid supplies said solid to said first conduit at a pressure greater than the pressure in said fourth conduit.

20. The apparatus of claim 10, further including means for measuring the temperature of each of said particulate solid in said first conduit, said transport medium in said third conduit and said particulate solid/transport medium stream in said fourth conduit, means for measuring the mass flow of said transport medium in said third conduit; flow control means connected to said third conduit for controlling the flow of said transport medium therein; computer/controller means for receiving signals from each of said temperature measuring means and said mass flow measuring means and for outputting a signal to said flow control means to control the operation thereof.

21. The apparatus of claim 20, further including means for measuring a selected parameter at a control point (a) in said vessel for receiving the transported solid or (b) in a process employing said particulate solid and transmitting a signal to said computer/controller means.

* * * * *